(12) United States Patent
Pennington et al.

(10) Patent No.: US 9,239,745 B1
(45) Date of Patent: Jan. 19, 2016

(54) METHOD AND APPARATUS FOR MANAGING SECURITY VULNERABILITY LIFECYCLES

(75) Inventors: William Pennington, San Jose, CA (US); Jeremiah Grossman, San Jose, CA (US); Robert Stone, Mountain View, CA (US); Siamak Pazirandeh, San Diego, CA (US)

(73) Assignee: Whitehat Security, Inc., Santa Clara, CA (US)

( * ) Notice: Subject to any disclaimer, the term of this patent is extended or adjusted under 35 U.S.C. 154(b) by 1900 days.

(21) Appl. No.: 11/864,712

(22) Filed: Sep. 28, 2007

Related U.S. Application Data

(60) Provisional application No. 60/827,400, filed on Sep. 28, 2006.

(51) Int. Cl.
*G06F 11/00* (2006.01)
(52) U.S. Cl.
CPC ..................................... *G06F 11/00* (2013.01)
(58) Field of Classification Search
CPC ...... G06F 21/554; G06F 21/56; H04L 63/145
USPC ............... 726/22–25; 713/176; 709/227–229
See application file for complete search history.

(56) References Cited

U.S. PATENT DOCUMENTS

| | | | |
|---|---|---|---|
| 2006/0069671 A1* | 3/2006 | Conley et al. ..................... 707/3 |
| 2006/0156156 A1* | 7/2006 | Elnozahy ....................... 714/746 |
| 2007/0283441 A1* | 12/2007 | Cole et al. ........................ 726/25 |
| 2009/0320138 A1* | 12/2009 | Keanini et al. .................. 726/25 |
| 2012/0331553 A1* | 12/2012 | Aziz et al. ....................... 726/23 |

* cited by examiner

*Primary Examiner* — Jeffery Williams
*Assistant Examiner* — Suman Debnath
(74) *Attorney, Agent, or Firm* — Davis Wright Tremaine LLP; Philip H. Albert

(57) ABSTRACT

Vulnerability testing of a web application can be done using external testing, wherein an external test system runs with permissions of a user of the web application and interacts with the web application over a network, the external test system might obtain a schedule for a vulnerability test, execute the schedule using the external test system, log at least portions of responses of the web application to interactions of the external test system with the web application, compare portions of the responses to expected possible responses associated with particular possible vulnerabilities of the web application, thereby detecting possible vulnerabilities of the web application and, for at least one detected possible vulnerability, generating a retest script that comprises at least instructions to place the web application in a state at least similar to the state at which the at least one detected possible vulnerability was detected during execution of the schedule and that comprises at least instructions to interact with the web application in an attempt to recreate the detection without requiring reexecution of the schedule.

18 Claims, 2 Drawing Sheets

METHOD AND APPARATUS FOR MANAGING SECURITY VULNERABILITY LIFECYCLES

FIELD OF THE INVENTION

The present invention relates network server security in general and in particular to web application security scanning.

BACKGROUND OF THE INVENTION

There are a number of different configurations of network client-server interfaces available today, but the most common network in use is the Internet, a global internetwork of networks and networks that use Internet protocols and/or interfaces, such as extranets, intranets, local services, and other variations. In the general case, to which inventions described herein apply, clients connect to servers over the network and clients are not always trusted computers. As a result, the designers of the servers need to ensure that untrusted clients cannot perform malicious acts or access unauthorized portions of the server through the network.

One approach to ensure that servers cannot be accessed in an unauthorized manner is to only provide access to secured and trusted clients. However, in many situations, that is not possible. For example, if a merchant was running an on-line store, the merchant would want to allow most anyone who has a computer to access the servers providing the on-line store functionality, but do so in a way that still prevents unauthorized interactions with the servers.

Server security is more than just requiring a username and password from each client before responding to client requests, since even a logged in user might try for unauthorized access and a typical service provided by a server might include content and functionality for use by unauthenticated and unlogged-in clients. One approach to server security is to review all of the code that runs on the server and verify that it does not include statements that allow for unauthorized activity and review all the files present on the server and their respective permissions, side-effects, etc. While this might be practical for a small installation, say an FTP server that serves up predefined files to all comers, it is often not practical with complex, interactive applications that have many response modes.

One common use of servers in this environment, but not an exclusive use, is that of a web application. As used herein, "web" refers to a collection of documents/files, some of which have references, or links, to other documents/files in the collection. One example of a web is the World Wide Web ("WWW"), a collection of files served up by WWW servers (also called "web servers") using HTTP protocols or something similar. The "WWW" gets its name from the fact that most of these documents/files can be almost anywhere in the world and can be accessed anywhere in the world where there is Internet connectivity.

A web application is an application that runs on one or more server and provides some functionality or service in response to client requests received over a network using web protocols (i.e., HTTP, HTTPS, or something similar). An example of a web application is a database interface, wherein a database runs on a database system and clients can access data in that database system by sending a request for service over the network to a web application server. The web application server receives the request for service and decides, according to how it is programmed, what to do with the request. It can ignore the request, send an error message back to the client, or trigger an operation with the database system and respond to the client's request by sending the client the results of the database operation.

In a highly specific example, suppose a client computer system is operated by a customer seeking to configure and purchase a laptop computer. The customer would direct the client computer system to access a web application server operated by a vendor of laptop computers. The client computer system might send a request to the web application server via the network requesting a home page of the vendor. The web application server might respond with a home page that includes features allowing the client to interact with content on the home page (such as by selecting from available model names, features, etc.), send a subsequent request to the server, etc.

All the while, the web application server is making decisions about what is appropriate to send and what is not appropriate to send, based on its programming. For example, if the client computer sends a request for an updated page with updated pricing for new options selected by the customer, the web application server might perform some calculations, perform some database look-ups, generate a new dynamic web page and return that web page to the client computer in response to the request. However, if the client computer sends a request to see data about what someone else ordered, or internal data from the database server, the web application should properly refuse to respond to the request.

Because web applications are so complex, securing a web application and testing for security vulnerabilities, often involves an automated testing of the web application. Client-side web application testing refers to tests that are run from a client's point of view. For example, a client-side test suite might have logic for logging in to a web application, applying valid and invalid requests to the web application, noting the web application's responses and evaluating those responses. For example, if the test suite sends a request to the web application for ordering products where the prices have been altered and the response is "invalid order", the test suite might note that the web application is secure in that regard, but if the response is "thank you for your order", the test suite might note that the web application is not secure.

Once vulnerabilities have been identified, they can be brought to the attention of a web application designer for handling. Of course, if vulnerabilities are missed by the automated web application test suite, those vulnerabilities might never get fixed. Ideally, these vulnerabilities can be spotted programmatically, so that an analyst does not have to manually review all of the responses of the web application. Unfortunately, the wide variety of possible responses of a web application precludes trivial response checking.

In view of the above, the inventions described herein provide improvements over existing approaches.

BRIEF SUMMARY OF THE INVENTION

In embodiments of vulnerability testing of a web application using external testing, wherein an external test system runs with permissions of a user of the web application and interacts with the web application over a network, the external test system might obtain a schedule for a vulnerability test, execute the schedule using the external test system, log at least portions of responses of the web application to interactions of the external test system with the web application, compare portions of the responses to expected possible responses associated with particular possible vulnerabilities of the web application, thereby detecting possible vulnerabilities of the web application and, for at least one detected possible vulnerability, generating a retest script that comprises at least instructions to place the web application in a state at least similar to the state at which the at least one detected possible vulnerability was detected during execution of the schedule and that comprises at least instructions to interact with the web application in an attempt to recreate the detection without requiring reexecution of the schedule.

The comparing might comprise searching a web page, returned by the web application in response to executing the schedule, for keywords associated with particular vulnerabilities. The retest scripts to generate or execute might be determined manually. The retest scripts might be generated based on manual tests.

The following detailed description together with the accompanying drawings will provide a better understanding of the nature and advantages of the present invention.

DETAILED DESCRIPTION OF THE INVENTION

An improved web application security scanner is described herein. A web application security scanner exercises a web application to find vulnerabilities and/or functional errors. For example a scanner might identify files on a web application server that are accessible but should not be, errors in web application logic, vulnerabilities wherein the web application accepts altered or unexpected inputs instead of responding with an error message.

A web application test suite performs tests against a web application by sending client requests from a testing computer to the server running the web application and checking how the web application responds. A thorough web application security scan might involve thousands of checks and responses. As part of that scan, many results might require additional review and individual results might need to be created.

In one improvement, a tester can return to a part of a test and retest the web application in the context it had when the full test was run, thus allowing for spot testing and elimination of false positives.

The examples herein are not intended to be exhaustive, but describe embodiments of the present invention. Where individual items are shown, multiple items might be present, unless otherwise indicated. Where an indefinite number of items are shows or described, such as by parenthetical references to (1), (2), . . . , (n), the actual number is not limiting, unless otherwise specified. It should be noted that, unless otherwise indicated, the domain names used in the examples are not intended to refer to actual domains and any similarity is merely coincidental.

A web application test suite, or "test suite", performs tests against a web application by sending client requests from a testing computer to the server running the web application and checking how the web application responds. A thorough web application security scan might involve thousands of checks and responses. As a result, some sort of programmatic analysis is needed. A test suite might execute a Web Application Security Scan (WASS) by issuing a series of requests to a web application in the form of test URIs (Uniform Resource Identifiers) and noting the responses made by the web application. URIs can be dynamic, wherein the page referenced by the URI does not exist until a request is made and responses might also be dynamic in that they are generated to be specific to a particular request.

Figure 1:
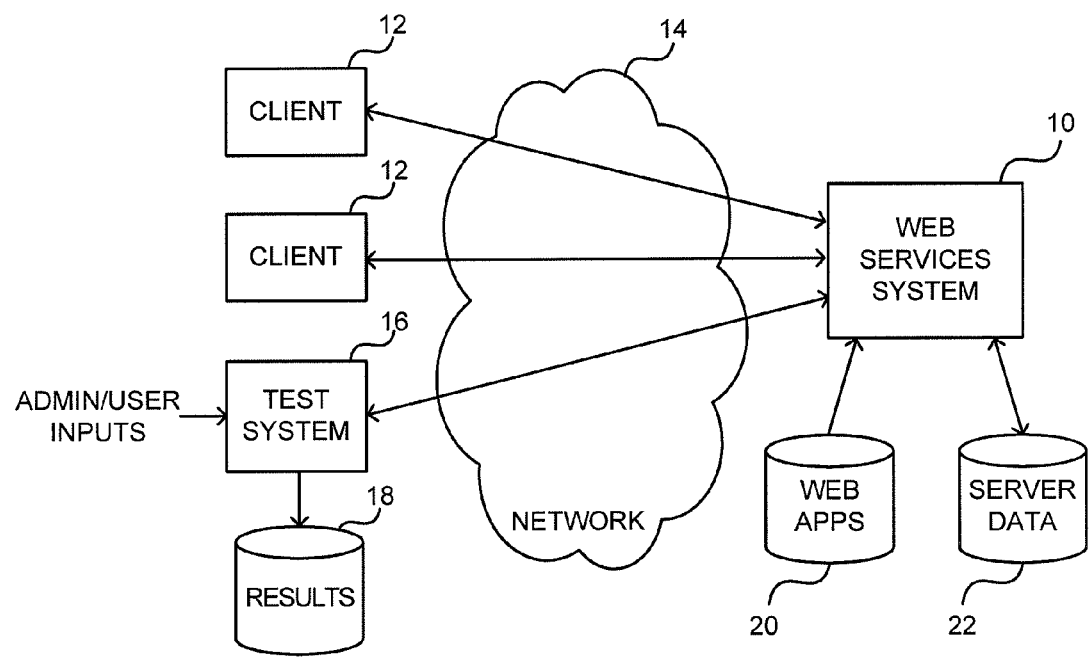
FIG. 1 is a block diagram illustrating a context of a test system according to aspects of the present invention.

FIG. 1 is a block diagram illustrating a context of a test system according to aspects of the present invention. As shown therein, a web services system 10 under test can be tested in the environment it normally operates in, such as an environment wherein clients 12 interact with web services system 10 over a network 14. A test system 16, which might be a programmed computer or software running on a multi-purpose computer, can also interact with web services system 10 as if it were a client. Test system 16 generates results 18 usable for assessing whether web services system 10 provides any vulnerabilities.

In particular, the operator of web services system 10 might be interested in vulnerabilities that allow outside entities or systems to access web applications 20 that are executed by web services system 10 or server data 22 that is maintained by web services system 10 and possibly used by web applications 20, where the access is in ways not expected by the designers of such systems that unnecessarily expose those systems. One method of determining potential vulnerabilities is to run a long set of interactions, such as simulating a wide variety of interactions that a client might have with web applications 20 and tracking the results of those interactions. A simple example would be to attempt to access protected files in the server data to check whether a web application allowed the access (bad) or blocked the access (good).

Ideally, the process of scanning a web application for security issues should properly divide the work between an automated process and a human process, with the automated process handling highly repetitive tasks that can be specified by rules and program instructions, while the human process provides the understanding, discretion and insight to the overall process.

One example of an automated process is the process of collecting all possible URIs, such as by spidering a web application. Another example is a process of sending requests to the web application and evaluating the response, where each of the requests is a URI or a variation thereof.

Certain aspects of testing suffer from a lack of scalability, but other portions of the assessment process lend themselves well to automation. A Web Application Security Scanner (WASS) apparatus or process can be part of a test suite. An optimized WASS process offloads the menial and highly repetitive tasks of assessment from the human tester, while surfacing key decisions to the human tester. By nature, a WASS process will generate a great deal of resulting data (representing vulnerabilities at many levels of severity and risk), which need to be tracked, organized, distilled, and made available to an expert consultant for verification and retesting. If data is not sufficient to recreate a condition, then it is difficult to achieve the ultimate goal of a WASS process, which is to find security vulnerabilities in a way that they can be fixed. If a tester finds a vulnerability, but cannot recall how to recreate it or otherwise explain it, there is little chance that a programmer or developer can later modify the web application to eliminate the vulnerability.

A WASS process or system that implements a Vulnerability Management Framework (VMF) can address such requirements. At a low level, the results of a WASS process can be seen as the cross section of 1) all original and manipulated requests made on the target web site, 2) all tests applied to each response, and 3) all times in history when this test was performed. As used herein, original requests are requests that are expected of the web application, while manipulated requests are original requests modified to attempt to expose a vulnerability—a proper response from a web application is to refuse to respond to a manipulated response, and possibly to trigger a breach alert. The target web site might comprise a collection of web pages and features that are resident on and/or served by a web server and supporting equipment.

Figure 2:
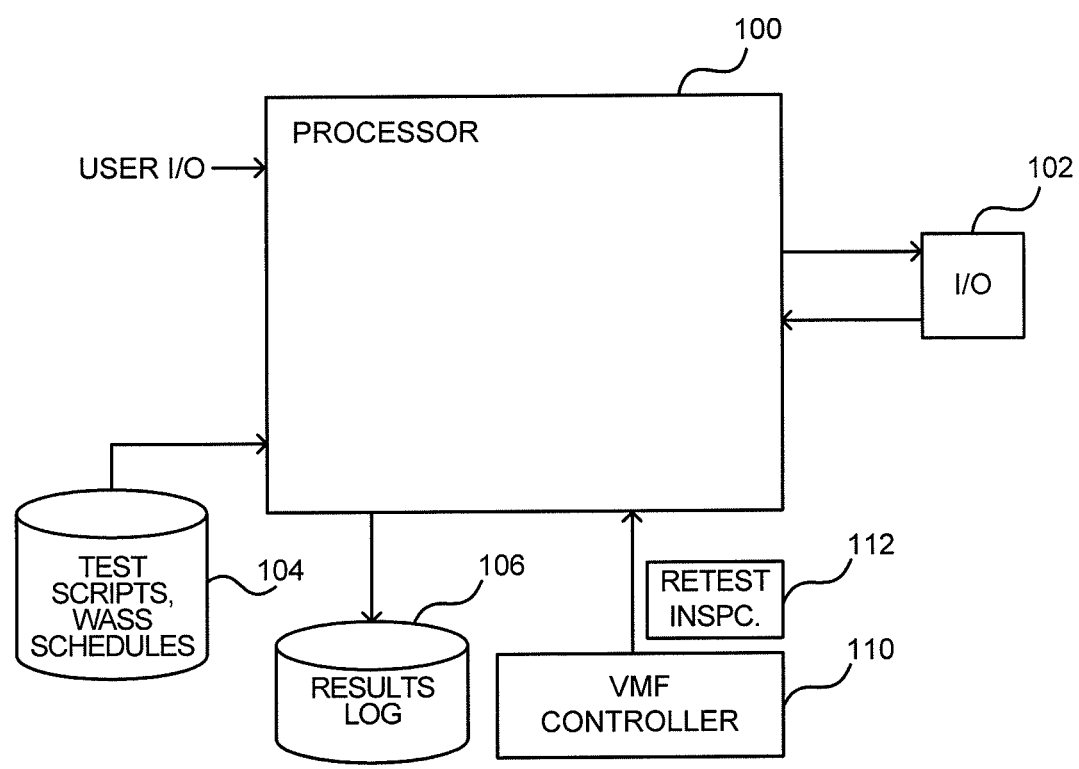
FIG. 2 is a block diagram illustrating details of the text system.

FIG. 2 is a block diagram of a test system shown in greater detail. As shown there, a processor 100 is programmed to read instructions and generate requests that an I/O section 102 sends to a web application and receives responses. In an example, processor 100 might issue an HTML request, an RFC request, a telnet request, an FTP request or the like by formatting a message and passing it to I/O section 102 that transmits the message over a network to an addressed server, service and/or system, which may return a response, which I/O section 102 might return to processor 100. It is well-known to use particular protocols to generate and transmit messages and requests and receive responses, so such details need not be mentioned here.

In an example test system, processor 100 might generate requests based on a reading of WASS schedules from storage 104, send those requests, and store the corresponding results in a results log file 106. Processor 100 might process the results to determine vulnerabilities, but those might also be determined by a post-processor. In a particular WASS schedule, the processor might run through a long sequence of events in an attempt to detect vulnerabilities (or the lack thereof) in a web application.

After a WASS schedule and/or test scripts are run, a VMF controller 110 might determine that further information is needed. This determination might be automated or might be the result of human review of the results log. In either case, where the VMF controller is directed to obtain further information about the web applications and/or potential vulnerabilities, the VMF controller 110 can send retest instructions 112 to processor 100 to run a retest. As explained elsewhere herein, the retest instructions 112 will typically include instructions to reconstruct the state for a portion of the tests run for a WASS schedule. As one example, the state might be the login state of the test system during the test, the particular click history of the test, the data used, etc. This would allow a tester to specify retest of only a small portion of a full test specified by a WASS schedule.

Each "test" might be considered based on a state comprised of opinions by scanner and human about whether the test in question indicates a vulnerability, a lack of vulnerability, or an error. This is a very comprehensive representation allowing for point in time state information at the granular level of a single test. However, higher level, human readable slices of this 4-dimensional lattice might be created to allow for a presentation layer.

At another level, a vulnerability can be seen as the set of all tests matching a certain criteria such as 1) a given site, 2) a given path, and 3) a given class of vulnerability. This view allows a human to read into a slice of the above-mentioned 4 dimensional lattice, in a way that makes sense to a human. A VMF data structure of a scanner might be based on that structure. If so, the overall status of a vulnerability can then be represented as operation on the states of all its tests. The relationship between a vulnerability and its tests is dictated by the customizable way the consultant wants to search across the tests.

Verification

Ideally, the task of a WASS process should be "To correctly find all vulnerabilities of a given web application, based on black box testing". Due to the complexity/difficulty of the problem, many conventional scanners might produce either an overabundance of false positives or an understatement of the vulnerabilities. Both situations greatly reduce the effectiveness of the WASS process as an assessment tool.

It is much more realistic for a WASS to aim to manipulate an application and report all seemingly vulnerable or suspicious requests/responses to a human for verification. With that in mind, the process of presenting scanners' decisions to a human expert for the act of verification is important in presenting high quality and correct results to the end user. With the VMF in place, this is possible.

Retesting

Since a test can refer to a point data at an instance in time, an end user or expert consultant user of a WASS process should be provided with an ability to "retest" by resending a test's request and running its associated test at any given time, upon human or scanner's request. The result of retesting will have an accumulative effect on the state of the test, and therefore on the overall vulnerability. Retesting of a vulnerability trickles down to retests on all its associated tests. In effect, VMF infrastructure integrates with the WASS process to provide a mechanism for rerunning a test.

With retesting ability in place, the VMF provides the WASS process with the necessary data to start every scan by running an auto retest phase, which quickly runs through all known vulnerabilities and retests them. This spares users from having to wait for a scan to arrive at those tests through its normal path of web application exploration (which can be quite time consuming).

The VMF preferably provides for retesting vulnerabilities that were generated by a human, or that are not automatically re-testable. It should provide feedback to the end user about a pending manual retesting on the vulnerability or its tests. Such requests might be queued up to the human experts, who might proceed with pen testing practices, in order to determine the validity of the vulnerability to be retested.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method of vulnerability testing of a web application using external testing, wherein an external test system runs with permissions of a user of the web application and interacts with the web application over a network, the method comprising:

obtaining a schedule for a vulnerability test, the schedule comprising a plurality of steps to be performed by the external test system to detect particular vulnerabilities of the web application, wherein at least some of the plurality of steps alter a state of the web application such that at least one later step would operate differently given the altered state;

executing the schedule using the external test system;

logging at least portions of responses of the web application to interactions of the external test system with the web application;

comparing portions of the responses to expected possible responses associated with particular possible vulnerabilities of the web application, thereby detecting possible vulnerabilities of the web application; and for at least one detected possible vulnerability, generating a reconstruction script that comprises at least instructions to place the web application, before attempting to eliminate the at least one detected possible vulnerability, in a state at least similar to the state at which the at least one detected possible vulnerability was detected during execution of the schedule and that comprises at least instructions to interact with the web application in an attempt to recreate the detection of the at least one detected possible vulnerability without requiring reexecution of the schedule so as to facilitate the process of eliminating the at least one detected possible vulnerability, wherein the detected possible vulnerability is a set of tests matching a certain criteria and wherein the certain criteria include a given site, a given path, and a given class of vulnerability.

2. The method of claim 1, wherein comparing comprises searching a web page, returned by the web application in response to executing the schedule, for keywords associated with particular vulnerabilities.

3. The method of claim 1, further comprising accepting manual user input indicating which reconstruction scripts to generate or execute.

4. The method of claim 1, further comprising:
logging a plurality of inputs to the external test system done by a manual tester corresponding to a manual test; and
generating, at least semi-automatically, a reconstruction script to recreate the manual test as an automatic test.

5. The method of claim 1, further comprising:
generating a sequence of a plurality of reconstruction scripts;
automatically executing sequence of a plurality of reconstruction scripts.

6. The method of claim 1, wherein the state of the web application includes a login state and an identifier of a user who is logged in when testing occurs.

7. The method of claim 1, further comprising:
determining whether further information is needed about at least one of the web application and the possible vulnerabilities,
wherein the reconstruction script is generated if it is determined that further information is needed.

8. The method of claim 7, wherein determining whether further information is needed is performed automatically.

9. The method of claim 7, wherein determining whether further information is based on the logged responses of the web application.

10. The method of claim 1, wherein the state at which the at least one detected possible vulnerability was detected includes at least one of:
a login state of the external test system while executing the vulnerability test;
a particular click history of the vulnerability test; and
data used for the vulnerability test.

11. A computing device for testing a web application, wherein a web application is a program that operates on a server and interacts with clients that access the program over a network, wherein further the web application accepts parameters that define results generated from the web application, the computing device comprising:

a computer processor configured to read machine-readable instructions from a tangible, non-transitory computer-readable medium, the machine-readable instructions comprising:

program code for obtaining a schedule for a vulnerability test, the schedule comprising a plurality of steps to be performed to detect particular vulnerabilities of the web application, wherein at least some of the plurality of steps alter a state of the web application such that at least one later step would operate differently given the altered state;

program code for executing the schedule;

program code for logging at least portions of responses of the web application;

program code for comparing portions of the responses to expected possible responses associated with particular possible vulnerabilities of the web application, thereby detecting possible vulnerabilities of the web application; and program code for, for at least one detected possible vulnerability, generating a reconstruction script that comprises at least instructions to place the web application, before attempting to eliminate the at least one detected possible vulnerability, in a state at least similar to the state at which the at least one detected possible vulnerability was detected during execution of the schedule and that comprises at least instructions to interact with the web application in an attempt to recreate the detection of the at least one detected possible vulnerability without requiring reexecution of the schedule so as to facilitate the process of eliminating the at least one detected possible vulnerability, wherein the detected possible vulnerability is a set of tests matching a certain criteria and wherein the certain criteria include a given site, a given path, and a given class of vulnerability.

12. The computing device of claim 11, wherein comparing comprises searching a web page, returned by the web application in response to executing the schedule, for keywords associated with particular vulnerabilities.

13. The computing device of claim 11, wherein the machine-readable instructions further comprise:
program code for logging a plurality of inputs by a manual tester corresponding to a manual test; and
program code for generating, at least semi-automatically, a reconstruction script to recreate the manual test as an automatic test.

14. The computing device of claim 11, wherein the machine-readable instructions further comprise:
program code for determining whether further information is needed about at least one of the web application and the possible vulnerabilities,
wherein the reconstruction script is generated if it is determined that further information is needed.

15. A non-transitory computer-readable medium tangibly embodying a program of machine-readable instructions executable by a digital processing apparatus having stored thereon instructions configured to test a web application, the computer-readable medium being electronically readable, comprising:

program code for obtaining a schedule for a vulnerability test, the schedule comprising a plurality of steps to be performed to detect particular vulnerabilities of the web application, wherein at least some of the plurality of steps alter a state of the web application such that at least one later step would operate differently given the altered state;
program code for executing the schedule;
program code for logging at least portions of responses of the web application;
program code for comparing portions of the responses to expected possible responses associated with particular possible vulnerabilities of the web application, thereby detecting possible vulnerabilities of the web application; and
program code for, for at least one detected possible vulnerability, generating a reconstruction script that comprises at least instructions to place the web application, before attempting to eliminate the at least one detected possible vulnerability, in a state at least similar to the state at which the at least one detected possible vulnerability was detected during execution of the schedule and that comprises at least instructions to interact with the web application in an attempt to recreate the detection of the at least one detected possible vulnerability without requiring reexecution of the schedule so as to facilitate the process of eliminating the at least one detected possible vulnerability, wherein the detected possible vulnerability is a set of tests matching a certain criteria and wherein the certain criteria include a given site, a given path, and a given class of vulnerability.

16. The computer-readable medium of claim 15, wherein comparing comprises searching a web page, returned by the web application in response to executing the schedule, for keywords associated with particular vulnerabilities.

17. The computer-readable medium of claim 15, wherein the machine-readable instructions further comprise:
   program code for logging a plurality of inputs by a manual tester corresponding to a manual test; and
   program code for generating, at least semi-automatically, a reconstruction script to recreate the manual test as an automatic test.

18. The computer-readable medium of claim 15, wherein the machine-readable instructions further comprise:
   program code for determining whether further information is needed about at least one of the web application and the possible vulnerabilities,
   wherein the retest script is generated if it is determined that further information is needed.

* * * * *